United States Patent Office 3,476,384
Patented Nov. 4, 1969

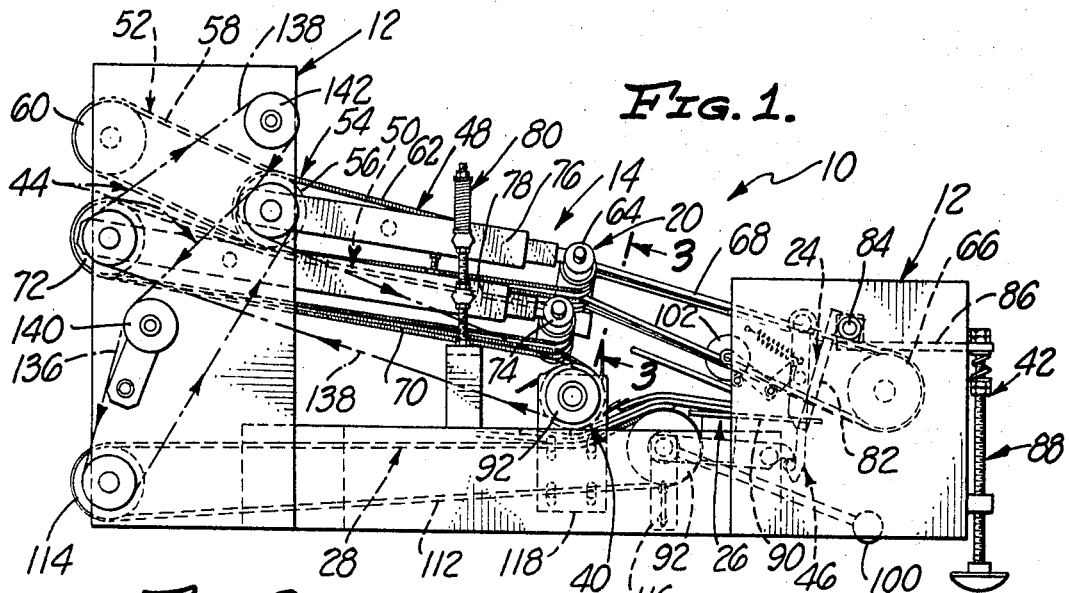
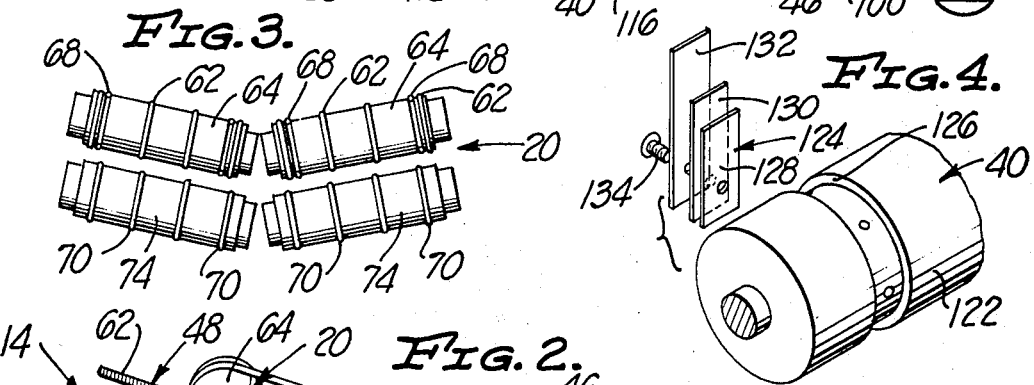
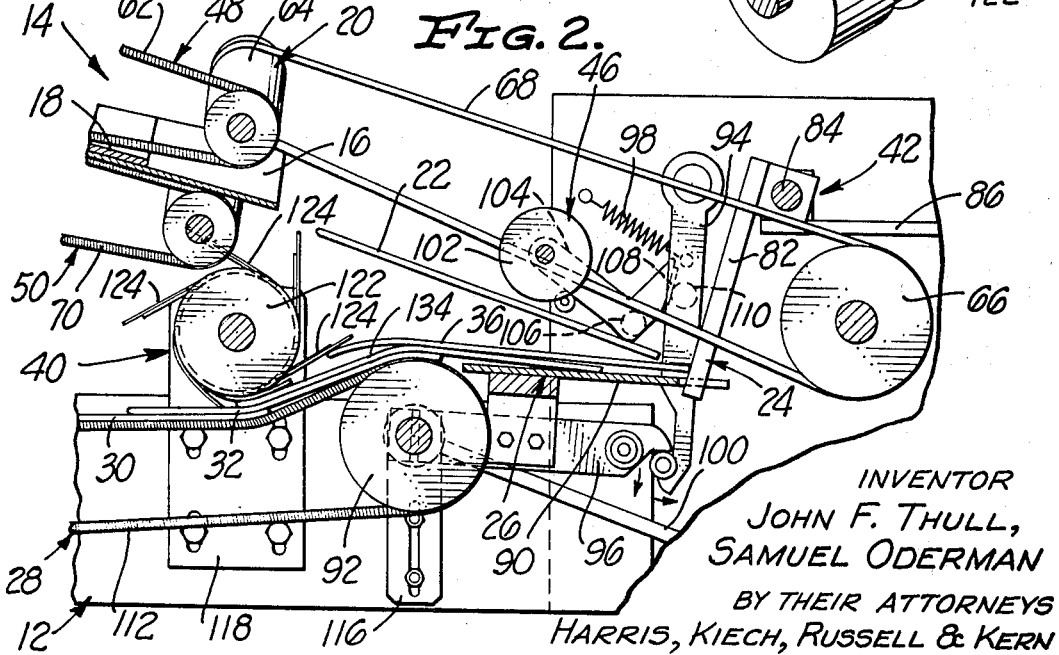

3,476,384
NEWSPAPER-STREAM REVERSING APPARATUS
John F. Thull, Costa Mesa, and Samuel Oderman, Whittier, Calif., assignors to Sta-Hi Corporation, Newport Beach, Calif., a corporation of California
Filed July 14, 1967, Ser. No. 653,436
Int. Cl. B65h 5/02, 29/58
U.S. Cl. 271—76                                    5 Claims

ABSTRACT OF THE DISCLOSURE

An apparatus comprising an upper conveyor for conveying a stream of folded newspapers in one direction with their cut edges leading and a lower conveyor for conveying the stream of newspapers in the opposite direction with their folded edges leading, the lower conveyor having a section located below the discharge end of the upper conveyor in a position to receive at least the folded edges of successive newspapers. A stop spaced from the discharge end of the upper conveyor is engageable by the cut edges of successive newspapers to stop them so that their direction of movement may be reversed by the lower conveyor. The discharge end of the upper conveyor includes troughing rollers for stiffening the newspapers against buckling as their cut edges impinge against the stop. A rotary presser between the lower conveyor and the discharge end of the upper conveyor presses the folded edges of successive newspapers halted by the stop downwardly toward the lower conveyor.

Background of invention

Typical newspaper cutting and folding apparatuses discharge streams of folded newspapers in overlapping relation with their cut edges leading. Ordinarily it is desirable to deliver such streams of newspapers to other equipment, such as stacking equipment, with their folded edges leading, but without inverting the newspapers. Typically, such a newspaper-stream reversing apparatus includes an upper conveyor means movable in one direction for conveying the stream of newspapers in said one direction with their cut edges leading, lower conveyor means movable in the opposite direction for conveying the stream of newspapers in said opposite direction with their folded edges leading, the lower conveyor means having a section located below the discharge end of the upper conveyor means in a position to receive thereon at least the folded edges of successive newspapers discharged by the discharge end of the upper conveyor means, and stop means spaced from the discharge end of the upper conveyor means in said one direction, and engageable by the cut edges of successive newspapers discharged by the discharge end of the upper conveyor means, for stopping such newspapers so that their direction of movement may be reversed by the lower conveyor means.

An example of a prior newspaper-stream reversing apparatus of the foregoing general type may be found in Patent No. 3,224,558, granted Dec. 21, 1965 to B. R. J. Carlén.

Summary and objects of invention

Summarizing the invention, it comprises a newspaper-stream reversing apparatus of the foregoing general character having means for stiffening the newspapers against buckling as their cut edges impinge against the stop means, and having means for insuring that the folded edges of successive newspapers stopped by the stop means are brought into conveying engagement with the lower conveyor means to be conveyed thereby with their folded edges leading.

More particularly, a primary object of the invention is to provide the discharge end of the upper conveyor means with troughing means for troughing successive newspapers about central lines perpendicular to their cut edges as they are discharged from the upper conveyor means. This has the effect of stiffening the newspapers against buckling as their cut edges impinge against the stop means, which is an important feature of the invention.

Another primary object is to provide rotary pressing means between the discharge end of the upper conveyor means and the lower conveyor means, and rotatable about a horizontal axis extending transversely of the upper and lower conveyor means, for gripping the folded edges of successive newspapers stopped by the stop means and for pressing them downwardly toward the lower conveyor means. This insures that successive newspapers will be taken away by the lower conveyor means in the proper relative positions, which is another important feature.

Another object of the invention is to provide a newspaper-stream reversing apparatus wherein the troughing means includes upper and lower troughing roller assemblies between which successive newspapers pass as they are discharged from the discharge end of the upper conveyor means.

Still another object is to provide a rotary pressing means comprising a roller and a plurality of circumferentially spaced, flexible and resilient, pressing elements carried by the roller. Related objects are to provide pressing elements which comprise leaf spring assemblies and which extend tangentially of the pressing roller.

A further object is to provide a stop means for the cut edges of the newspapers which is movable to vary the distance thereof from the discharge end of the upper conveyor means.

Another object of the invention is to provide means for releasing a jam of newspapers forming between the discharge end of the upper conveyor means and the stop means, thereby preventing damage to the apparatus.

Description of drawing

In the drawing:
FIG. 1 is a side elevational view of a newspaper-stream reversing apparatus which embodies the invention;
FIG. 2 is an enlarged, longitudinal sectional view of the newspaper-stream reversing apparatus of FIG. 1;
FIG. 3 is a fragmentary sectional view taken as indicated by the arrowed line 3—3 of FIG. 1; and
FIG. 4 is a fragmentary, exploded, perspective view showing a portion of a rotary pressing means of the invention.

Description of preferred embodiment of invention

In the drawing, the newspaper-stream reversing apparatus of the invention is designated generally by the numeral 10 and is shown as including a suitable frame 12 on which the various components of the apparatus are mounted. The reversing apparatus 10 includes upper conveyor means 14 for conveying a stream of folded newspapers 16, 18, et seq., in one direction, e.g., toward the right as viewed in FIG. 2 of the drawing. The upper conveyor means 14 conveys the newspapers 16, 18, et seq., with their cut edges leading and preferably, but not necessarily, in overlapped relation.

The discharge end of the upper conveyor means 14 is provided with a troughing means 20, FIG. 3, for troughing each newspaper about a central line perpendicular to its cut edge as it negotiates the discharge end of the upper conveyor means. Once discharged, each newspaper is projected through space in the direction of newspaper movement produced by the upper conveyor means, as indicated by the newspaper 22 in FIG. 2. The cut edge of each troughed newspaper, such as the newspaper 22, projected through space from the discharge end of the upper conveyor means 14 in this manner impinges against a stop means 24, the latter being spaced from the discharge end of the upper conveyor means a distance slightly greater than the distance between the cut and folded edges of the newspapers. The troughing of each newspaper about its central axis perpendicular to its cut edge stiffens it against buckling as it cut edge impinges against the stop means 24, which is an important feature.

As the cut edge of each newspaper impinges against the stop means 24, the cut edge and the adjacent portion of the newspaper falls onto a supporting means 26 adjacent and substantially at the same level as an inlet section of a lower conveyor means 28 which runs in the opposite direction from the upper conveyor means 14. It will be noted that the inlet section of the lower conveyor means 28 is located below the discharge end of the upper conveyor means 14 in a position to receive thereon the folded edges and adjacent portions of successive newspapers discharged by the discharge end of the upper conveyor means and stopped by the stop means 24. The lower conveyor means 28 conveys the newspapers deposited thereon and on the supporting means 26 away in overlapped or spaced relation and in a direction opposite to the direction of the incoming stream produced by the upper conveyor means 14. In FIG. 2, the lower conveyor means 28 is shown as conveying away a stream of overlapped newspapers 30, 32, 34, 36, et seq., with their folded edges leading.

A rotary pressing means 40 is mounted on the frame 12 between the discharge end of the upper conveyor means 14 and the inlet section of the lower conveyor means 28. More particularly, the rotary pressing means 40 is located above the inlet section of the lower conveyor means 28 and is rotated about a horizontal axis extending transversely of the upper and lower conveyor means 14 and 28. The rotary pressing means 40 serves to press the folded edges of successive newspapers 30, 32, 34, 36, et. seq., downwardly against the lower conveyor means 28 to insure that they are taken away smoothly by such conveyor means in the desired spaced or overlapped relationship, depending upon the speed of the lower conveyor means relative to that of the upper conveyor means 14.

In the light of the foregoing general description of the structure and operation of the newspaper-stream reversing apparatus 10, it will be clear that the apparatus takes a stream of spaced or overlapped folded newspapers moving with their cut edges leading and converts such stream into a stream of spaced or overlapped newspapers moving in the opposite direction with their folded edges leading, all without inverting the newspapers. (Although the present description is limited to folded newspapers for convenience, it will be understood that the invention is equally applicable to any folded signatures, such as magazines, and the term "newspapers" is intended to cover such other signatures.)

In addition to the foregoing general components, the newspaper-stream reversing apparatus 10 of the invention includes the following additional general components: means 42 for adjusting the position of the stop means 24 relative to the discharge end of the upper conveyor means 14 and the inlet end of the lower conveyor means 28 to assure a smooth transfer of each newspaper from the upper conveyor means to the lower conveyor means; means 44 for driving the upper and lower conveyor means 14 and 28 and the rotary pressing means 40; and means 46 for releasing any newspaper jam which may occur between the stop means 24 and the adjacent ends of the upper and lower conveyor means 14 and 28.

With the foregoing general description of the structure and mode of operation of the newspaper-stream reversing apparatus 10 in mind, the various general components thereof will now be described in more detail.

The upper conveyor means 14 includes upper and lower conveyors 48 and 50 between which the incoming stream of newspapers passes. The upper conveyor 48 includes inlet and outlet sections 52 and 54 which include a common, transverse driving roller 56 driven in any suitable manner, not shown. The driving roller 56 is a grooved roller having trained therearound coiled conveying elements 58 of the type commonly used in the newspaper industry, the conveying elements 58 also being trained around a transverse grooved roller 60 carried by the frame 12. The outlet section 54 of the upper conveyor 48 similarly includes coiled conveying elements 62 trained around the grooved driving roller 56 and around transverse upper troughing rollers 64 constituting an upper troughing roller assembly of the troughing means 20. As will be clear from FIG. 3 of the drawings, the two troughing rollers 64 are arranged in the form of a relatively flat V.

Downstream from the discharge end of the upper conveyor 48 forming part of the upper conveyor means 14 is a transverse grooved roller 66 having coiled conveying elements 68 trained therearound and around the troughing rollers 64. The conveying elements 68 tend to confine the projected newspapers discharged by the upper conveyor means 14, such as the newspaper 22, against excessive upward movement.

The lower conveyor 50 forming part of the upper conveyor means 14 similarly comprises coiled conveying elements 70 trained around a transverse grooved roller 72 adjacent and below the roller 60, and around transverse troughing rollers 74 adjacent and below the troughing rollers 64. The troughing rollers 74 are also arranged in a relatively flat V and, together with the troughing rollers 64, comprise the troughing means 20.

The upper and lower troughing rollers 64 and 74 are respectively carried by pivoted arms 76 and 78, FIG. 1, mounted on the frame 12 for pivotal movement about the axes of the respective rollers 56 and 72. An adjustment means 80 is provided to pivot the arms 76 and 78 relative to each other to vary the spacing between the upper troughing rollers 64 and the lower troughing rollers 74 to accommodate newspapers of different thicknesses.

The stop means 24 is shown as comprising a single stop 82 extending transversely of the path of newspapers projected through space from the discharge end of the upper conveyor means 14, although a plurality of such stops in transversely spaced relation may be employed. As best shown in FIG. 2, the stop 82 is fixed on a transverse shaft 84 pivotally mounted on the frame 12. Fixedly connected to the shaft 84 is a lever 86 for pivoting the stop 82 to vary its spacing from the discharge end of the upper conveyor means 14. A suitable threaded adjusting means 88, FIG. 1, mounted on the frame 12 is connected to the lower lever 86 to adjust the position of the stop 82. With this arrangement, the position of the stop 82 can be adjusted to assure a smooth transition of successive newspapers from the upper conveyor means 14 to the lower conveyor means 28.

The supporting means 26 between the stop means 24 and the inlet end of the lowest conveyor means 28 comprises a generally horizontal shelf 90 extending transversely of the upper and lower conveyor means 14 and 28, one edge of this shelf being notched to receive the stop 82. The entire supporting means 26 is pivotable about the axis of rotation of a transverse, grooved roller 92 forming part of the lower conveyor means 28, as will be described hereinafter. With this construction, the entire supporting means 26 can pivot downwardly, under the influence of gravity, to permit newspapers projected by the upper conveyor means 14 to bypass the stop means 24 whenever necessary to prevent a newspaper jam in this area from damaging the reversing apparatus 10.

Normally, the supporting means 26 is held in its upper, operative position, by a latch means comprising a latch member 94 capable of hooked engagement with a member 96 forming part of the supporting means 26. The latch member 94 is pivotally mounted on the frame 12 at its upper end, and is biased into latched engagement with the member 96 by a tension spring 98. The supporting means 26 may be pivoted upwardly into its operative position by a re-setting handle 100 connected thereto.

If a jam develops between the stop means 24 and the adjacent ends of the upper and lower conveyor means 14 and 28, the accumulated newspapers engage a roller 102 mounted on an L-shaped arm 104 pivotally mounted on the frame 12 at 106. The jammed newspapers engaging the roller 102 cause the arm 104 to pivot in the clockwise direction, as viewed in FIG. 2, so that a shoe 108 at the end of such arm acts on a roller 110 on the latch member 94 to pivot such latch member into a position to release the member 96. When this occurs, the supporting means 26 pivots downwardly, under the influence of gravity, into a retracted, inoperative position to permit subsequent projected newspapers to pass the stop means 24 to alleviate the jam, thereby preventing damage to the newspaper-stream reversing apparatus 10.

Turning now to the lower conveyor means 28, it includes, as previously indicated, the grooved transverse roller 92. Trained around this roller are coiled conveying elements 112 which are also trained around a grooved roller 114, FIG. 1, generally below the rollers 60 and 72. As will be apparent, the reversed newspapers 30, 32, 34, 36, et seq., conveyed by the lower conveyor means 28 rest on the coiled conveying elements 112 and pass between same and the rotary pressing means 40. To adjust for different newspaper thicknesses, the roller 92 is mounted on vertically adjustable brackets 116, and the rotary pressing means 40 is similarly mounted on vertically adjustable brackets 118. Suitable bolt-and-slot connections, or the like, are employed to vertically adjustably connect these brackets to the frame 12.

As best shown in FIG. 2 of the drawing, as the cut edge of each newspaper impinges against the stop means 24, the cut edge and the adjacent portion of such newspaper are supported by the supporting means 26. The folded edge of each newspaper and the adjacent portion thereof overlie the inlet end of the lower conveyor means 28, or, more accurately, the roller 92 and adjacent portions of the upper runs of the conveying elements 112. The function of the rotary pressing means 40 is to grip the folded edges and adjacent portions of successive newspapers and press them downwardly against the inlet end of the lower conveyor means 28, or, more accurately, against preceding newspapers on the lower conveyor means, to insure a smooth takeaway of each newspaper with the proper spacing between it and the preceding newspaper, irrespective of whether the newspapers are taken away in overlapped relation, as shown, or in spaced relation. The rotary pressing means 40 performs this function with what might be described as a combing action.

More particularly, the rotary pressing means 40 comprises a transverse pressing roller 122 mounted for vertical adjustment on the brackets 118. This roller carries a plurality of transversely spaced sets of circumferentially spaced, pressing or combing elements 124. The pressing elements 124 are flexible and resilient and, as best shown in FIG. 2, extend tangentially of the roller 122. The pressing elements 124 extend tangentially in such directions, relative to the clockwise direction of rotation of the pressing roller 122, as viewed in FIG. 2, that the outer ends of the pressing elements successively engage the folded edge of a newspaper being transferred to the lower conveyor means 28, such as the newspaper 36, to force it downwardly, with a combing action, to insure a smooth transfer to the lower conveyor means.

Referring to FIG. 4, the pressing roller 122 is provided with an annular groove 126 therein for each set of circumferentially spaced pressing elements 124. Each pressing element 124 comprises progressively longer spring leaves 128, 130 and 132 having their inner ends set in the groove 126 and secured to the pressing roller 122 by a screw 134. The longest spring leaf 132 is the outermost spring leaf in the radial direction with respect to the pressing roller 122. With this construction, each pressing element 124 has its greatest flexibility adjacent its outer end, where it comes in contact with the folded edges of successive newspapers. The flexibility progressively decreases toward the inner end of each pressing element 124.

The driving means 44 connects the various driven components to the driving roller 56 and may comprise chains, or the like, trained over suitable sprockets, or the like. For convenience, the driving means 44 is shown only diagrammatically and includes two drive trains 136 and 138. The drive train 136 may be regarded as a chain trained around suitable sprockets connected to the driving roller 56 and the roller 114, and trained over a tension-adjusting idling sprocket 140. The drive train 138 may be regarded as comprising a chain trained around sprockets respectively connected to the driving roller 56 and the rollers 72 and 92, and also around a tension-adjusting idling sprocket 142. As will be apparent, the drive trains 136 and 138 thus drive the upper and lower conveyors of the upper conveyor means 14, the lower conveyor means 28, and the rotary pressing means 40, in timed relation. The various remaining rollers of the upper and lower conveyor means 14 and 28 are driven through the corresponding coiled conveying elements thereof in a manner which will be apparent without further description.

It is thought that the over-all operation of the newspaper-stream reversing apparatus 10 of the invention will be clear from the foregoing. Consequently, no further description is necessary herein.

Although an exemplary embodiment of the invention has been disclosed herein for purposes of illustration, it will be understood that various changes, modifications and substitutions may be incorporated in such embodiment without departing from the spirit of the invention as hereinafter claimed.

We claim as our invention:

1. In an apparatus for reversing the direction of movement of a stream of folded newspapers having cut and folded edges, without inverting the newspapers, the combination of:
 (a) upper conveyor means movable in one direction for conveying the stream of newspapers in said one direction with their cut edges leading;
 (b) lower conveyor means movable in the opposite direction for conveying the stream of newspapers in said opposite direction with their folded edges leading;
 (c) said upper conveyor means having a discharge end for discharging successive newspapers with their cut edges leading;
 (d) said lower conveyor means having a section located below said discharge end of said upper conveyor means in a position to receive thereon at least the folded edges of successive newspapers discharged by said discharge end of said upper conveyor means;
 (e) stop means spaced from said discharge end of said upper conveyor means in said one direction and engageable by the cut edges of successive newspapers discharged by said discharge end of said upper conveyor means for stopping such newspapers so that their direction of movement may be reversed by said section of said lower conveyor means;
 (f) rotary pressing means between said discharge end of said upper conveyor means and said section of said lower conveyor means, and rotatable about a horizontal axis extending transversely of said upper and lower conveyor means, for pressing the folded edges of successive newspapers stopped by said stop means downwardly toward said section of said lower conveyor means, said rotary pressing means including a roller and a plurality of circumferentially spaced, flexible and resilient, pressing elements carried by said roller; and (g) means for driving said upper and lower conveyor means and said rotary pressing means.

2. A newspaper-stream reversing apparatus as defined in claim 1 wherein said pressing elements extend tangentially of said roller.

3. A newspaper-stream reversing apparatus according to claim 2 wherein said pressing elements comprise leaf spring assemblies.

4. A newspaper-stream reversing apparatus according to claim 1 wherein said discharge end of said upper conveyor means includes troughing means for troughing successive newspapers about central lines perpendicular to their cut edges as they are discharged so as to stiffen the newspapers against buckling as their cut edges impinge against said stop means.

5. A newspaper-stream reversing apparatus as set forth in claim 1, including:
   (a) supporting means for the cut edges of the newspapers located between said stop means and the inlet end of said lower conveyor means;
   (b) means mounting said supporting means for downward pivotal movement, under the influence of gravity, into a lower, inoperative position wherein newspapers discharged by said discharge end of said upper conveyor means can travel past said stop means;
   (c) means for latching said supporting means in an upper, operative position wherein it causes the cut edges of said newspapers to impinge on said stop means; and
   (d) means responsive to a jam of newspapers between said discharge end of said upper conveyor means and said stop means for releasing said latching means.

References Cited

UNITED STATES PATENTS

| | | | |
|---|---|---|---|
| 1,289,443 | 12/1918 | Gorynski | 198—84 |
| 1,487,882 | 3/1924 | Parker | 198—167 |

FOREIGN PATENTS

| | | |
|---|---|---|
| 442,115 | 2/1936 | Great Britain. |
| 1,384,175 | 1/1965 | France. |

EDWARD A. SROKA, Primary Examiner

U.S. Cl. X.R.

93—49; 271—45